US010076967B2

United States Patent
Ahmed et al.

(10) Patent No.: US 10,076,967 B2
(45) Date of Patent: Sep. 18, 2018

(54) METHOD AND APPARATUS FOR WIRELESS CHARGING ACCESS POINT IDENTIFICATION

(71) Applicant: FORD GLOBAL TECHNOLOGIES, LLC, Dearborn, MI (US)

(72) Inventors: Hanan J. Ahmed, Belleville, MI (US); John Scott Turik, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/295,083

(22) Filed: Oct. 17, 2016

(65) Prior Publication Data

US 2018/0105053 A1   Apr. 19, 2018

(51) Int. Cl.
| | | |
|---|---|---|
| B60L 11/18 | (2006.01) | |
| H02J 7/02 | (2016.01) | |
| H04W 88/08 | (2009.01) | |
| H04W 4/00 | (2018.01) | |
| H04W 84/12 | (2009.01) | |
| H02J 7/00 | (2006.01) | |
| H04W 4/80 | (2018.01) | |

(52) U.S. Cl.
CPC ....... *B60L 11/1833* (2013.01); *B60L 11/1829* (2013.01); *B60L 11/1846* (2013.01); *H02J 7/025* (2013.01); *H02J 2007/0096* (2013.01); *H04W 4/008* (2013.01); *H04W 4/80* (2018.02); *H04W 84/12* (2013.01); *H04W 88/08* (2013.01)

(58) Field of Classification Search
CPC ..................... B60L 11/1833; B60L 11/1829
See application file for complete search history.

(56) References Cited

U.S. PATENT DOCUMENTS

| | | | |
|---|---|---|---|
| 9,329,597 B2 * | 5/2016 | Stoschek ................ G05D 1/021 |
| 9,371,007 B1 * | 6/2016 | Penilla ................ B60L 11/1848 |
| 9,815,382 B2 * | 11/2017 | Penilla ................ B60L 11/1848 |
| 9,921,726 B1 * | 3/2018 | Sculley ................ G06F 3/0484 |
| 2010/0174629 A1 * | 7/2010 | Taylor ................... G06Q 20/10 705/34 |
| 2010/0235006 A1 * | 9/2010 | Brown ................. B60L 11/182 700/286 |
| 2011/0043163 A1 * | 2/2011 | Baarman ................ H02J 5/005 320/108 |
| 2011/0288765 A1 * | 11/2011 | Conway ............ G01C 21/3469 701/533 |
| 2012/0150670 A1 * | 6/2012 | Taylor ................... G06Q 20/10 705/16 |
| 2014/0239733 A1 * | 8/2014 | Mach ..................... H02J 5/005 307/104 |

(Continued)

*Primary Examiner* — Adam D Tissot
*Assistant Examiner* — Alex C Dunn
(74) *Attorney, Agent, or Firm* — Jennifer Stec; Brooks Kushman P.C.

(57) ABSTRACT

A system includes a processor configured to detect communication signals from an access point. The processor is also configured to determine an access point affiliation with a wireless charging pad based on data included in the communication signals, the data also providing charging pad compatibility characteristics. The processor is further configured to determine vehicle compatibility with the charging pad based on the compatibility characteristics and responsive to a vehicle being compatible with the charging pad, connect to the access point.

8 Claims, 7 Drawing Sheets

(56) References Cited

U.S. PATENT DOCUMENTS

| | | | |
|---|---|---|---|
| 2015/0015193 A1* | 1/2015 | Oman | B60L 11/1829 |
| | | | 320/108 |
| 2015/0091389 A1* | 4/2015 | Byrne | H02J 5/005 |
| | | | 307/104 |
| 2015/0139082 A1 | 5/2015 | Banks et al. | |
| 2015/0326061 A1* | 11/2015 | Davison | H02J 7/0044 |
| | | | 320/108 |
| 2016/0075242 A1 | 3/2016 | Kim et al. | |
| 2016/0268833 A1* | 9/2016 | Lee | H02J 50/80 |
| 2016/0336804 A1* | 11/2016 | Son | H02J 7/0027 |
| 2017/0136885 A1* | 5/2017 | Ricci | B60L 11/005 |
| 2017/0136891 A1* | 5/2017 | Ricci | B60L 11/182 |
| 2017/0136902 A1* | 5/2017 | Ricci | B60L 11/1825 |
| 2017/0140349 A1* | 5/2017 | Ricci | G06Q 20/102 |
| 2018/0111494 A1* | 4/2018 | Penilla | H02J 7/02 |

* cited by examiner

METHOD AND APPARATUS FOR WIRELESS CHARGING ACCESS POINT IDENTIFICATION

TECHNICAL FIELD

The illustrative embodiments generally relate to a method and apparatus for wireless charging access point identification.

BACKGROUND

As electric vehicles become more common, more and more locations will build charging points for these vehicles. There are two typical ways to fully recharge an electric vehicle: wired charging, which involves connecting a charging cable to the vehicle; and wireless induction charging, which involves positioning the vehicle over or in proximity to an inductive charging mat, whereby the mat wirelessly charges the vehicle battery.

In the wired version of charging, an information connection is commonly provided as part of the connection cable. This facilitates information exchange between the vehicle and the charging point, allowing for charging to be configuration, measurement, monitoring, and payment.

In the wireless version of vehicle charging, a driver typically precisely positions the vehicle above a charging mat. Once in place with proper alignment, the vehicle begins charging. Since there is no wired connection in this model, a system is needed to facilitate information exchange between the charging point and the vehicle. One solution to this problem includes the use of a wireless access point provided in conjunction with the charging mat. Once the vehicle connects to the proper wireless access point, the vehicle and charging point can exchange information and the charging point can begin charging the vehicle.

Unfortunately, wireless access points are incredibly common in the modern world. So, at any given time, a vehicle approaching a charging point may have a variety of access points from which to choose. These can include charging points other than that which a driver desires to use, as well as any other wireless access points broadcasting accessibility in an area. If a vehicle connects to the wrong or undesirable access point, the driver may not know that the vehicle is incompatible with the desired charging mat, or there may simply be a long delay until the appropriate connection is established. In other examples, people with malicious intent could even provide open networks that appear to be wireless charging point networks, to which a vehicle may connect only to have the vehicle computing system improperly accessed via the connection.

SUMMARY

In a first illustrative embodiment, a system includes a processor configured to detect communication signals from an access point. The processor is also configured to determine an access point affiliation with a wireless charging pad based on data included in the communication signals, the data also providing charging pad compatibility characteristics. The processor is further configured to determine vehicle compatibility with the charging pad based on the compatibility characteristics and responsive to a vehicle being compatible with the charging pad, connect to the access point.

In a second illustrative embodiment, a system includes a processor configured to determine that a first charging pad associated with a wireless access point is available for use. The processor is also configured to instruct the access point to communicate connection credentials and charging pad compatibility characteristics. The processor is further configured to receive a request from a vehicle computer, connected to the access point, to utilize the first charging pad. Also, the processor is configured to determine vehicle compatibility with the first charging pad and responsive to a requesting vehicle being compatible with the first charging pad, designate the first charging pad for use by the requesting vehicle.

In a third illustrative embodiment, a computer implemented method includes communicating access point credentials and charging pad compatibility characteristics via the access point, responsive to a determination that a charging pad associated with a wireless access point is available for use. The method also includes designating the charging pad for use by the vehicle, responsive to a request to use the charging pad received from a vehicle connected to the access point and for which compatibility with the charging pad has been determined.

DETAILED DESCRIPTION

As required, detailed embodiments are disclosed herein; however, it is to be understood that the disclosed embodiments are merely illustrative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
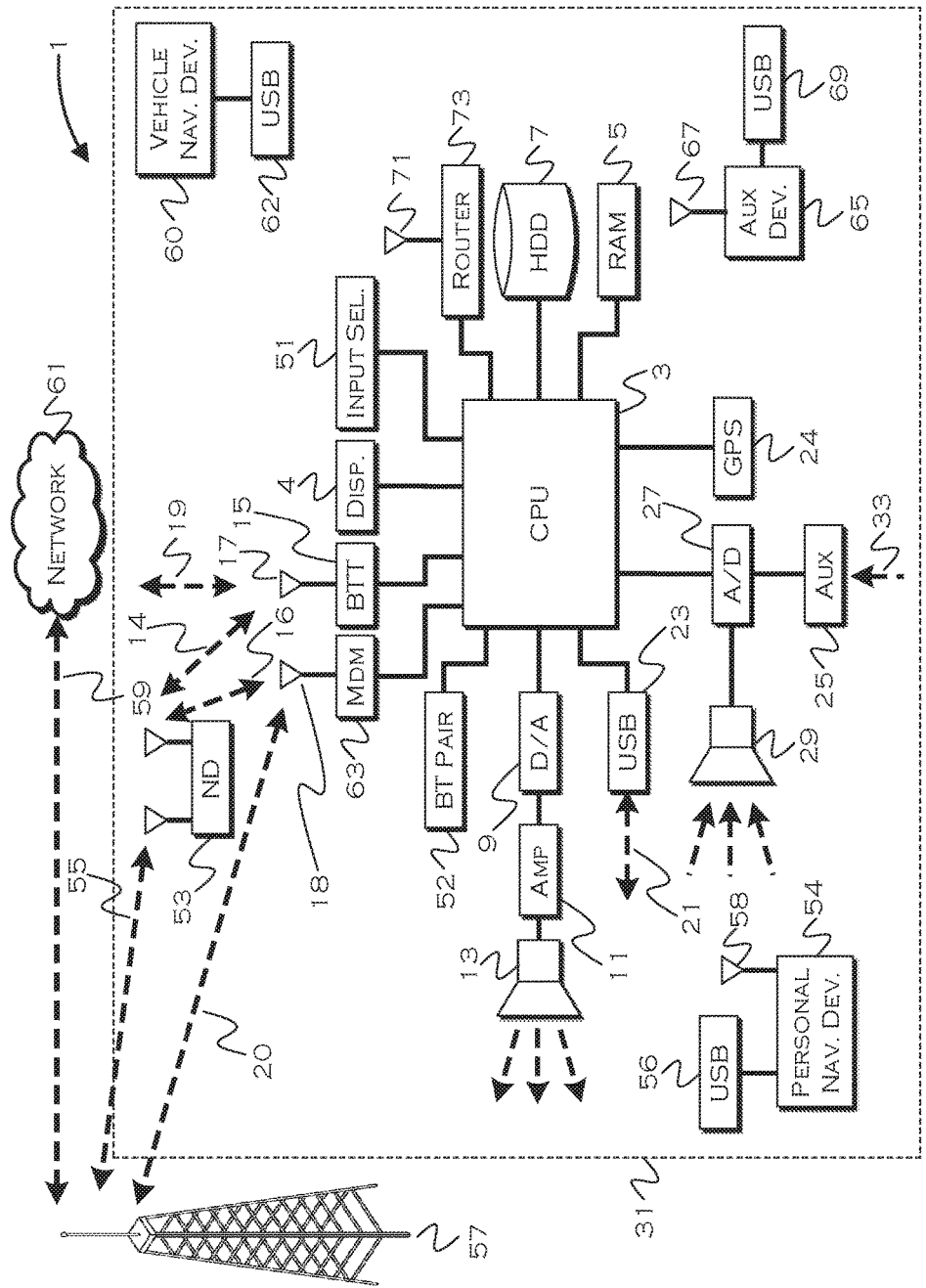
FIG. 1 illustrates an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition, speech synthesis, gestures and expression recognition.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802.11 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an IEEE 802.11 network (i.e., WiFi) or a WiMax (IEEE 802.16) or other wireless networks.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 802.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

The illustrative embodiments propose methods and apparatuses to avoid improper network connection prior to attempting to initiate a wireless charging session. In most wireless charging models, a wireless charging station will have at least one, and likely several Wi-Fi access points (APs) associated with the station. The APs could operate in the 2.4, 5 GHz or other Wi-Fi authorized bands, or a combination of bands. The access points will provide communication between a vehicle and the charging station. The Access Point serves as the radio-based communication link between the vehicle and the computer controlling the power electronics of the wireless charging station.

In such a model, the Access Point provides the radio link, but does not control the charging session. With conductive (wired) charging systems, the communication link between vehicle and charging station is physical—specifically a pilot wire over which charging control messages are sent & received.

Multiple vehicles may be simultaneously charging on multiple ground pads/charging coils. Depending on system design, one or multiple APs could be involved in providing the radio links for the charging of the multiple vehicles. Just as in home/office Wi-Fi systems, an AP may handle simultaneous communication with several client devices. In the preceding example, the vehicle Wi-Fi radio systems are the client devices.

Figure 2A:
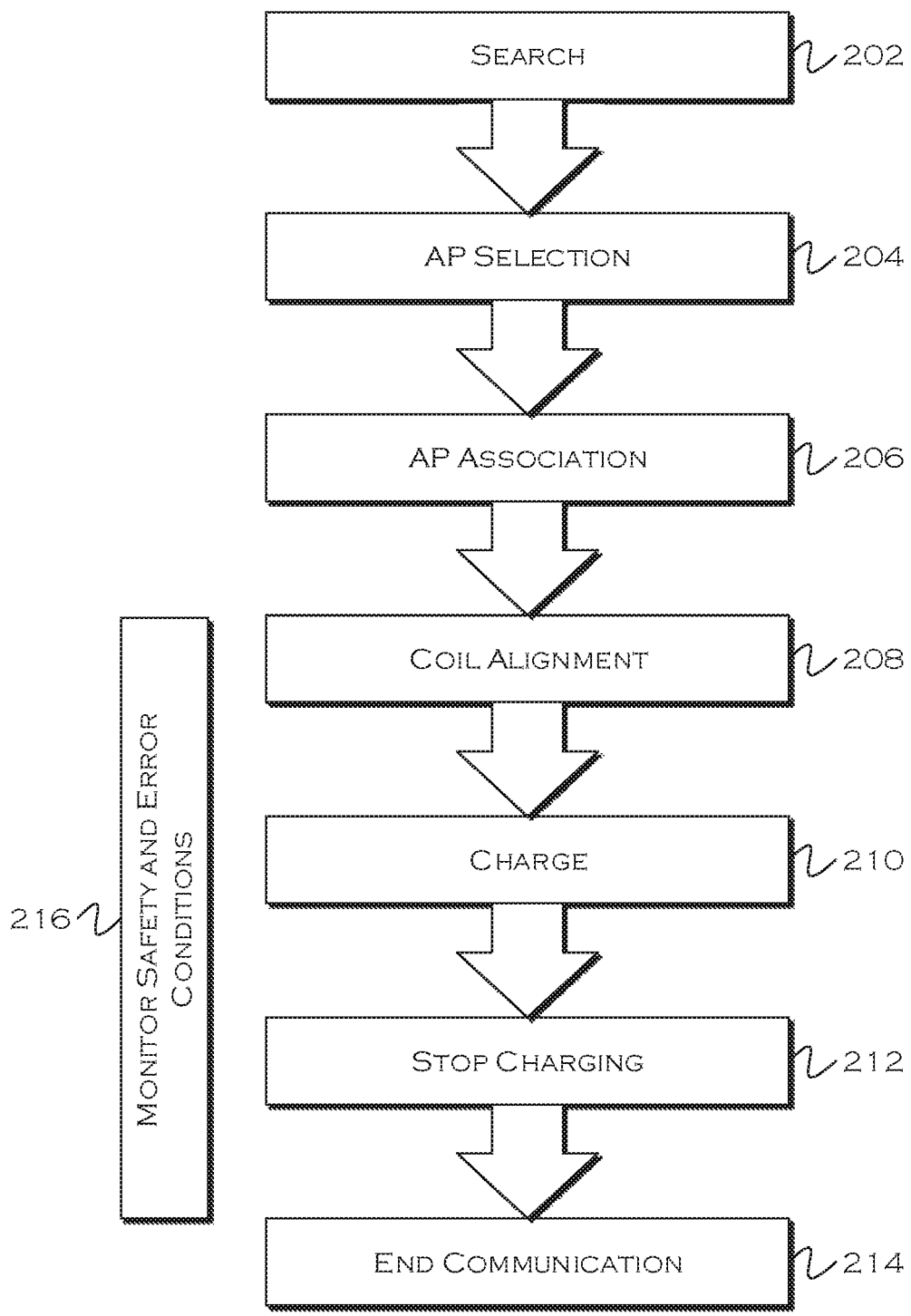
FIG. 2A shows an illustrative flow for wireless charging.

In order for the charging control message exchange to begin, the vehicle (Wi-Fi client) first associates with an Access Point ( ). Association involves the vehicle system presenting proper security credentials (SSID, password, etc.), authenticating, and then actually joining the Wi-Fi communication network of the wireless charging system. In one example, the association process takes place in the "Searching" operational phase 206 as illustrated in FIG. 2A.

After the vehicle has joined the wireless charging system's network, the charging station may exchange standardized messages with the vehicle for the purpose of positioning the vehicle. This may include messages that provide information to guide the vehicle into the parking space and properly align ground/vehicle charging coils.

Once the vehicle is properly aligned with the charging coils, the charging station may signal the vehicle to cease movement and wireless charging may begin. Depending on the specificity of alignment needed and/or the vehicle capabilities, it may be possible for the wireless charging station to actually control the last few feet of vehicle advancement, for example, guiding the vehicle to the appropriate position through message exchange. In autonomous vehicle models, the vehicle will likely be able to successfully self-position extremely precisely according to instructions received from the charging station.

Just as with a smartphone or laptop, the vehicle Wi-Fi system may store profiles containing security credentials of wireless charging systems it has previously visited and successfully joined. It may also store other useful or identifying information such as the geo-coordinates and payment related information. In instances where the vehicle has previously visited a charging station, for example, it may be easier and more efficient to connect a vehicle to a recognized AP, than it may be when a vehicle visits a new charging station or point for the first time. In situations where the vehicle recognizes the AP, the vehicle may automatically connect once the vehicle is in range of the AP. Additionally or alternatively, the vehicle may first receive indication of an available charging mat and some useful information associated with the AP before automatically connecting (so as not to connect to an AP where other vehicles already occupy the mats).

If the vehicle has not previously visited a charging site, a user may need to somehow select an AP. This can include, automatic selection of an AP having an open mat that is also compatible with a vehicle, or, for example, manual selection from a list. A manual association process may be done through a vehicle HMI or a mobile application.

The illustrative embodiments provide systems and methods for access point identification prior to a vehicle computer actually connecting to and handshaking with a particular access point.

As a driver approaches the wireless charging parking spot, there may be a question of whether the charging pad is compatible with a particular vehicle's wireless power transfer system. Since various original equipment manufacturers may use different types of wireless charging systems, compatibility with a particular charging system may be an issue. An initial compatibility check, prior to actually connecting to and exchanging data with a wireless access point, may save a driver a lot of annoyance. Also, for example, if a driver is not provided with compatibility information until a vehicle is connected to the access mat, and a driver waits 20-30 minutes for a charging mat, the driver may then connect to the access point only to find out that the charging mat is incompatible with the vehicle charging system.

Multiple parameters are used by a wireless power transfer system to determine compatibility between the vehicle charging coil and a ground pad/charging coil. These include, but are not limited to, maximum deliverable power, minimum and maximum ground clearance of the vehicle coil, system operating frequency, charging coil topology, and other possible manufacturer-specific data. In addition to parameters used to ensure successful power transfer between charging coils, other parameters specifying coil alignment methods or additional services other than charging may be used to assist the vehicle in selection of a desired charging spot. Other illustrative parameters may include, for example, charging station service provider ID, charging roaming consortium, Wi-Fi operator ID, charging station ID, charging station type (public free, private, public metered), tariff; charging method (time-based, flat, free), charging station operational status (out of service, reserved), security support (TLS), manufacturer ID, internet access availability, etc.

A one hundred percent match of parameters is not necessarily required, but certain mismatches will not allow the vehicle to charge. With wired charging systems, the issue of system compatibility is not really a major factor for conductive AC or DC charging. In most of those systems, the hardware, power delivery components, EVSE charge connectors, and vehicle charge inlets are all the same. But components of inductive (wireless) charging systems may vary widely, at least for the time being. For this reason, it may be useful to know some of these parameters before associating to an access point, while others may be known during or after association.

In the illustrative examples, an access point uses certain features of the Wi-Fi Spec IEEE 802.11-2012 such as, advertised services (802.11aq), interworking elements (802.11u) and hotspot 2.0 features to broadcast compatibility and other information from the wireless charging system APs before formal association occurs between electric vehicle and charging point Wi-Fi radio systems.

As opposed to establishing a formal connection with a vehicle, the proposed communication allows the vehicle to receive the information without connecting to a specific Wi-Fi network. Such a system may be useful to determine if it is reasonable, or even possible to attempt to park and charge at this location. Determining compatibility in advance can save a driver time and effort involved in precisely maneuvering a vehicle into position, waiting for an available bay, and/or connecting and re-connecting to a plurality of different access points until a proper utilizable charging pad is discovered.

Another potential usage of the illustrative embodiments could be to use multiple APs for vehicle guidance/positioning into the parking spot. A particular charging point's proper alignment could be known based on its relative position to multiple access points. If the location of a vehicle wireless receiver is also known (the location within the vehicle relative to a charge receptor location), then the vehicle receiver can be positioned at a specific distance from each of multiple access points (determinable based on, for example, received signal strength indicators), and the corresponding relative location of the charge receptor will be positioned correctly. For example, if a positional offset of the wireless receiver relative to the charge receptor is known, the vehicle can position itself such that the wireless receiver is in a location whereby the offset charge receptor is properly aligned.

FIG. 2A shows an illustrative flow for wireless charging. In this illustrative flow, a vehicle first searches 202 a location provided with one or more wireless charging pads, and associated access point(s). In this example, a conventional system is described, so in the absence of access point pre-association information acquisition as per the illustrative embodiments, a vehicle selects 204 an access point that is believed to be affiliated with a particular charging pad in a parking spot and attempts connection 206 with the access point.

Since wireless charging may require the vehicle to be located in a specific location, the driver then, typically under some instruction from the charging system controller, engages in a process to properly align vehicle and ground charging coils to within system tolerances 208. As can be seen, if the wrong access point is connected to the vehicle, significant time can be wasted reconnecting to other access points to find the proper access point, and/or positioning a vehicle only to discover that the charging pad and vehicle are incompatible.

Once a compatible vehicle is properly positioned over the charging pad, the wireless charging process begins 210. There may also be an exchange of credentials and payment information prior to the start of charging, but generally speaking the charging process will follow the flow as shown. The charging process continues until the vehicle battery is fully charged or reaches a desired charge level. At this point, the charging process ceases 212 and the communication session is terminated 214. Throughout coil alignment and the charging process the charging system controller monitors for safe operating conditions and error conditions to ensure safe and proper charging 216.

Figure 2B:
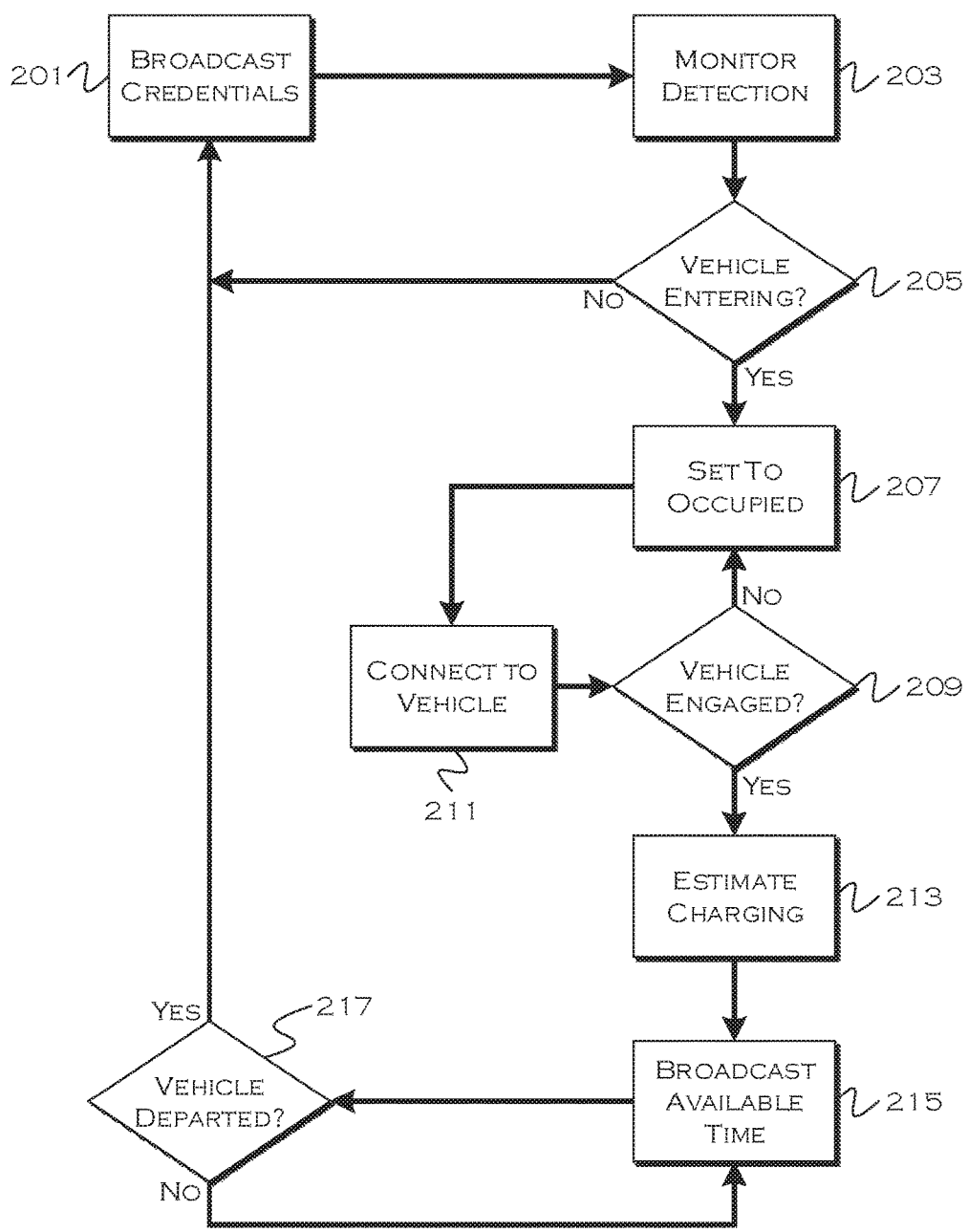
FIG. 2 B shows an illustrative process for credential broadcast.

FIG. 2B shows an illustrative process for credential broadcast. In this illustrative example, the access point will broadcast information relating to compatibility and essentially advertise its services for identification and acceptance by a vehicle. In some illustrative examples, certain information that is more critical to ensuring compatibility may accompany a broadcast, which can be received and processed by a vehicle without actually connecting to the access point (handshaking). This information can include, but is not limited to, pad status (occupied, reserved, free, etc.), supported protocols, charging services, maximum vertical height(s), payment options, etc. Other information may be designated as lower priority, and may include, but is not limited to, power capabilities (charging speeds), form of payment charge (tariff, time based, flat rate, etc.), charging consortium, etc. Information can be moved up or down in priority as appropriate, with a general goal to be efficient data exchange that preserves driver time and facilitates error-free connections with access points (e.g., no connection to incompatible pads, no connection to non-charging related access points, no connection to access points affiliated with occupied or reserved pads (for temporally proximate reservations), etc.). Based on the priority, the method of communication may be decided such as pre-association, during or post association.

The communication methods can include, for example, advertised services based on 802.11aq, interworking elements based on 802.11u and hotspot 2.0 features, access network query protocol (ANQP) over GAS, beacon/probe response and other similar means of receivable, interpretable broadcast. The vehicle should be able to receive critical information from the access point prior to connection, and to use that information to establish an appropriate connection.

Advertised services based on IEEE 802.11aq may be used to define a new service (e.g., Electric Vehicle Charging) which the access point advertises. In this example, an ASP infrastructure service defines, for example, service delivery in ASP-1 and session management in ASP-2. This example can use Wi-Fi direct, WPS security or regular infrastructure.

In an example using interworking elements under 802.11u and hotspot 2.0, the access point may advertise that it supports electric vehicle charging using the interworking element. The access point may include the interworking element in beacons and probe responses. The interworking element may include, for example, a venue group code, a venue type, and an access network type (e.g., public free, secured, etc.). Other venue group codes and/or venue types may be defined to include other compatibility information.

In an example using ANQP via 802.11u, the method may include the vehicle requesting access point information using ANQP/GAS request/response before association based on defined hotspot 2.0 specifications and 802.11u. The electric vehicle Wi-Fi STA may request information from the access point about charging support, and other needed compatibility parameters. The vehicle can also request a neighbor report from an already associated access point.

While the preceding describe methodologies that can be used pre-association to most efficiently establish which access points are or are not proper for use by a particular vehicle, use of some or all of the above in during-association or post-association processes to exchange information may also be possible.

In the example shown in FIG. 2, the access point broadcasts a set of credentials 201 usable by a vehicle to determine if the access point is appropriate for connection (e.g., if the access point is affiliated with an available, compatible charging pad). Since multiple vehicles may receive the broadcast and all desire access point services, a variety of methods can be used to "reserve" a particular pad responsive to acceptance by a vehicle.

In this example, a sensor is provided to the charging pad, which is monitored 203 to determine if a vehicle has actually begun the engagement process for the pad. As long as a vehicle is not entering 205, the process will continue broadcasting the space as available. In other examples, once a vehicle or driver accepts a particular access point, the space can be considered "reserved" for some period of time. Other suitable reservation/detection processes are also appropriate, depending on a provider's desired methodology for filling available charging pads.

Once a vehicle begins engagement 205, handshakes with the network, or otherwise accepts an available charging pad, the process can set a charging pad associated with the access point to "occupied" 207. If all pads associated with an access point are occupied, the process can broadcast a different state-signal with advertised services, indicating that no pads are currently available, and/or indicating when a pad may become available. In this example, for ease of explanation, the process will be explained for a system where charging pads and access points share a 1-to-1 relationship.

Once a vehicle has accepted a charging pad use offer broadcast from an access point, the process may connect to the vehicle formally via the access point 211. This may involve an exchange of credentials, payment information, etc., and may be similar to a typical connection to a wireless access point. The access point may also begin to send geo-coordinates or positioning instructions to the vehicle. The driver (or in some cases, an autonomous or partially autonomous vehicle) may use the received instructions to precisely position the vehicle to facilitate charging. Geo-coordinates may be obtained, for example, through GPS systems, pre-assigned and or with the help of other wireless positioning services based on cellular, Wi-Fi or others.

Once the vehicle is properly positioned, the charging can be engaged 209. The process estimates a charging time 213, and may change the broadcast once again to reflect an estimated amount of time until the charging pad is again available for use 215. By changing the broadcast in the manners described, if desired, the access point broadcast can serve to at least partially manage driver expectations and queuing for multiple vehicles seeking use of limited numbers of access points. At a minimum, under this scenario, drivers can at least have a sense of when they may be able to use a charging pad, and/or may use the broadcast information to reserve a pad for use at a later, available time. Until the vehicle departs, the access point designates the pad as occupied and the access point can update and broadcast the projected time when the pad will be available.

Figure 3:
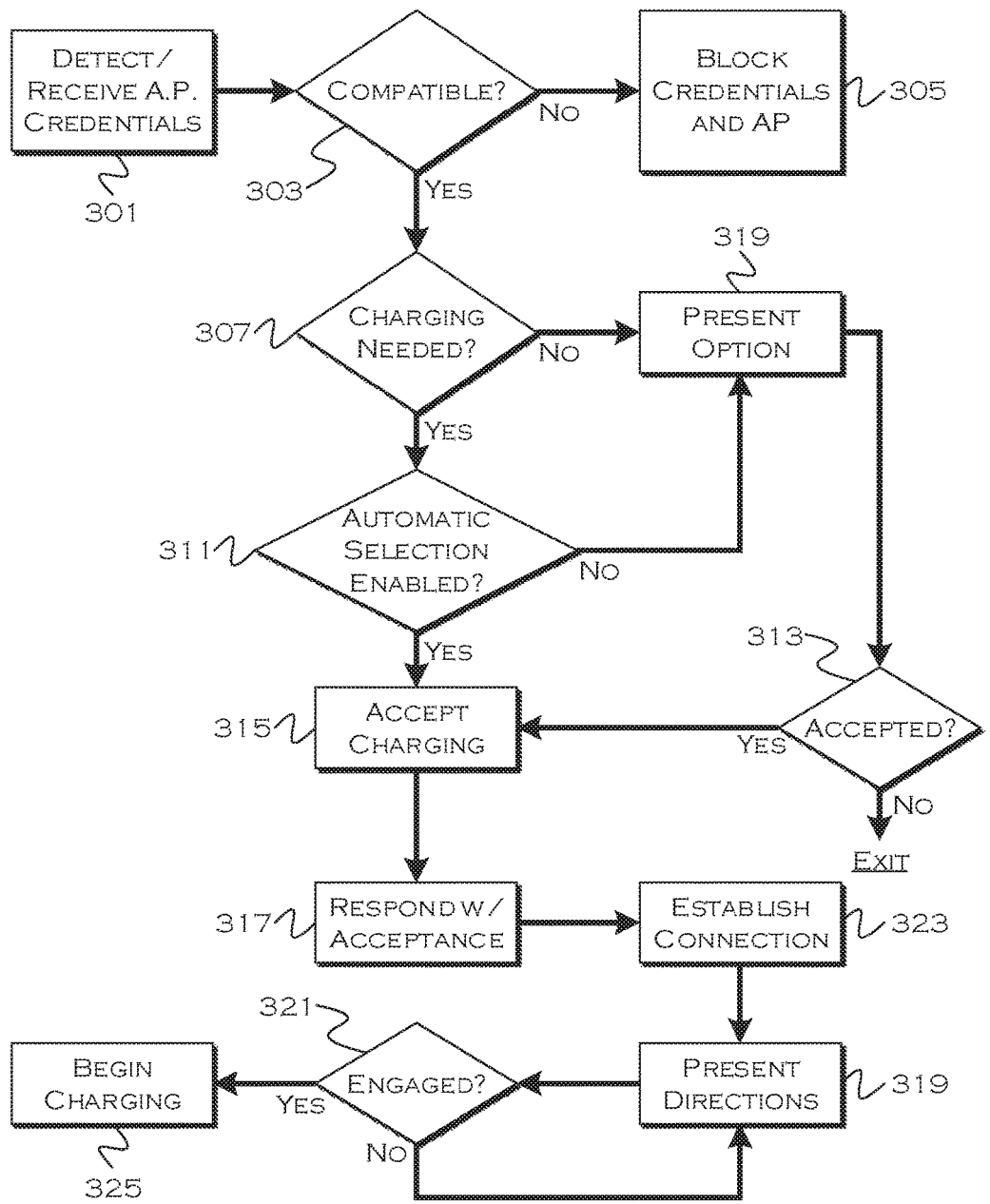
FIG. 3 shows an illustrative process for credential handling.

FIG. 3 shows an illustrative process for credential handling. In this illustrative example, the process executes on the vehicle to handle a broadcast from an access point in the manner(s) described or in a similar advertised services situation.

The vehicle receives the broadcast 301 that allows the vehicle to detect the access point and receive the access point credentials. In some implementations, the vehicle may receive this data in response to a probe or request sent out from the vehicle to which an access point responds.

In this example, based on the received credentials and definitions of one or more charging pads associated with the access point, the vehicle determines if the vehicle charging system is compatible with the advertised charging services 303. If the vehicle is incompatible, the process may block that access point based on a unique identifier (such as a MAC address) associated with the access point (to prevent inadvertent connection) 305. This blockage may be permanent or temporary, depending on whether charging compatibility of either the access point or vehicle is likely to change in the future.

If the vehicle and charging pad are compatible, as identified from the received information, the process may then determine if the vehicle needs charging 307. In other examples, the charging determination may be the cause of the vehicle looking for an appropriate access point in the first place. This may involve, for example, determining if the vehicle is below a predetermined minimum charge threshold, or, for example, if insufficient charge remains in the vehicle to complete a planned journey. If charging is not "needed," the vehicle may present a driver with an option to select the charging point for use 309.

If charging is "needed," under whatever conditions the vehicle defines need, the process may determine if automatic acceptance of the charging point is enabled 311. Since different queuing schema may be used by different charging providers, in certain situations it may be advantageous for a vehicle to automatically accept access to an available charging pad, especially if charging is needed. This could help ensure that the first vehicle on site is the first able to accept the offer, preventing occupation of an available charging pad by a later-arriving vehicle.

If automatic acceptance parameters are not set, or if automatic acceptance is not enabled, the process may again present the charging as an option for the vehicle driver 309. If parameters are set and/or automatic charging is enabled 311, the process may determine if any specified criteria are met (which may include, but are not limited to, cost, available time before a scheduled reservation by another vehicle, or other conditions that may affect a driver's willingness to utilize a particular point).

Once the charging offer has been accepted 315, by a user or vehicle, in this example, the vehicle sends a response accepting use of an identified charging bay 317. In this example, the acceptance by the vehicle 317 causes the connection to be formally established between the access point and the vehicle 323. This varies from the alternative example, shown in FIG. 2B, whereby entry of a vehicle into a region around a charging pad (and some form of short range identification) caused a particular vehicle to "claim" the charging pad. A particular pad-claiming solution may be varied based on presentation of charging options.

For example, an owner of a busy station where there are frequent lines for charging may wish to use the "entry=claiming" system to prevent vehicles in a rearward line position from claiming an open charging pad that the vehicle cannot even reach. In other examples, the first-accepted wireless signal may be used to designated a "claim" for the available pad. In still other examples, the process may also include a timeout function that "frees" a pad from a claim if the pad is not utilized by the claiming vehicle within a predefined time period.

In this example, the vehicle "claims" the charging pad by affirmatively responding to the access point communication and establishing a formal connection with the access point 323. At this point, the access point may direct the vehicle to an available (or the only) access-point associated charging pad 319. This can involve a series of driver directions and/or can involve some utilization of a vehicle autonomous or drive-assist procedure. Once the vehicle is properly positioned and the access point is engaged 321, the charging may commence 325. There may be multiple charging pad locations associated with one access point.

Figure 4:
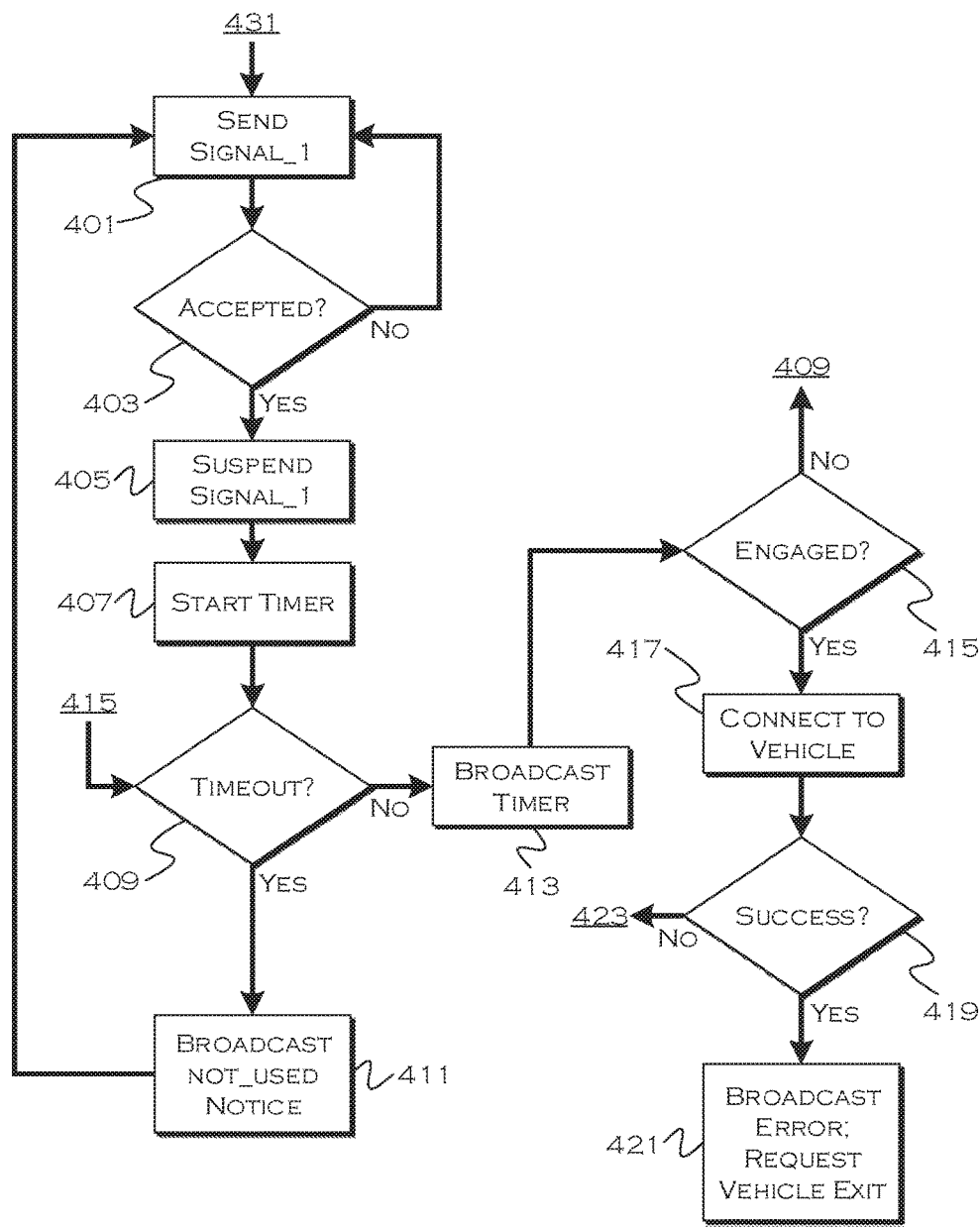
FIG. 4 shows another illustrative process for credential broadcast.
Figure 4:
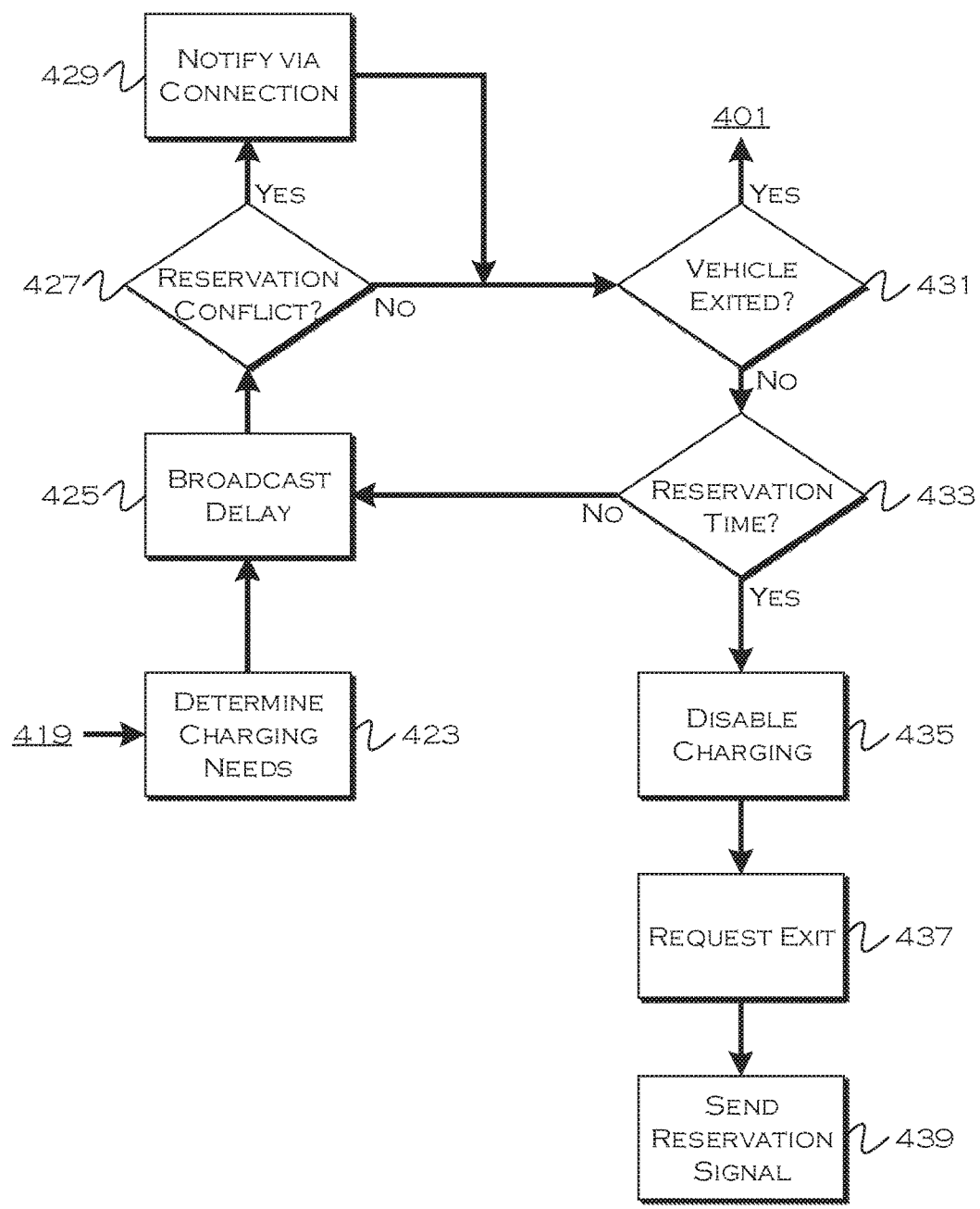

FIG. 4 shows another illustrative process for credential communication. In this illustrative example, the access point sends a first advertisement signal (signal_1) 401 when at least one charging pad is open and available, and/or for each open and available charging pad. If a vehicle accepts usage of an available charging pad 403, the process will suspend signal_1 for that pad (since the pad is no longer available) 405.

Once the process has ceased offering the pad for use, the process will begin a timer in this example 407. In this case, the timer prevents a driver from "claiming" an unused pad and then unduly delaying before actually using the pad. Until the timeout occurs 409, the process will broadcast the timer 413. Both the accepting vehicle and other vehicles may receive this timer broadcast, so that any and all interested drivers may know how long before the pad will be available based on non-use. If, at some point, the vehicle that accepted the pad offer engages a sensor or the actual power connection on the pad 415, the process will move forward, considering the pad now in-use. If the timeout happens prior to engagement, the process will broadcast a notice that the accepted offer was not used 411 (which can be received and presented by at least the accepting vehicle, which may not actually yet be connected to the network for direct communication). This lets the accepting driver that they missed their opportunity to use the pad, due to undue delay. The process can then resume communication of the signal_1 (indicating an available pad).

Once the vehicle has engaged the pad (or, in some cases, simply accepted the offer), the process will formally connect the access point to the vehicle for communication exchange 417. If the access point succeeds in establishing a connection 419, the process may continue, but if the access point cannot establish a connection (enabling direct communication), the access point may broadcast an error message 421. Until direct communication is established, by broadcasting error messages the access point can keep drivers appraised of the situation and availability of the particular pad associated with the access point. In this example, if the vehicle has already engaged or begun to engage the pad, the broadcast may also include a request for the vehicle to leave the pad, since a connection to facilitate charging cannot be established.

If the connection is successful, the process may communicate with the vehicle to determine the charging needs of the vehicle 423. This may include, for example, determining an amount of time before the charging pad will again be available, which the process may broadcast as a delay 425 for presentation to other drivers not directly connected to the access point. Also, in this example, if the anticipated charging time conflicts with a prior pad-use reservation 427, the process may directly notify the driver/vehicle that full charging cannot be completed due to prior reservation by another vehicle 429. The access point may also determine vehicle compatibility with the charging pad based on vehicle charging compatibility characteristics received by the access point.

At this point, until the vehicle exits the pad 431 or a pre-designated reservation time for another vehicle is reached 433, the process may continue to charge the vehicle and broadcast anticipated delays until the charging pad is available. If the vehicle exits, the process may resume signal_1 broadcast. If the reservation time for another vehicle arrives, the process may disable charging 435 (so the driver has no incentive to continue to use the charging point) and request that the vehicle exit the pad 437. A connection signal can then be sent to the reserving vehicle 439, assuming that the vehicle is within range. If the vehicle is not within range within another predetermined timeout period, the process can loop back and begin signal_1 (availability) broadcast.

Figure 5:
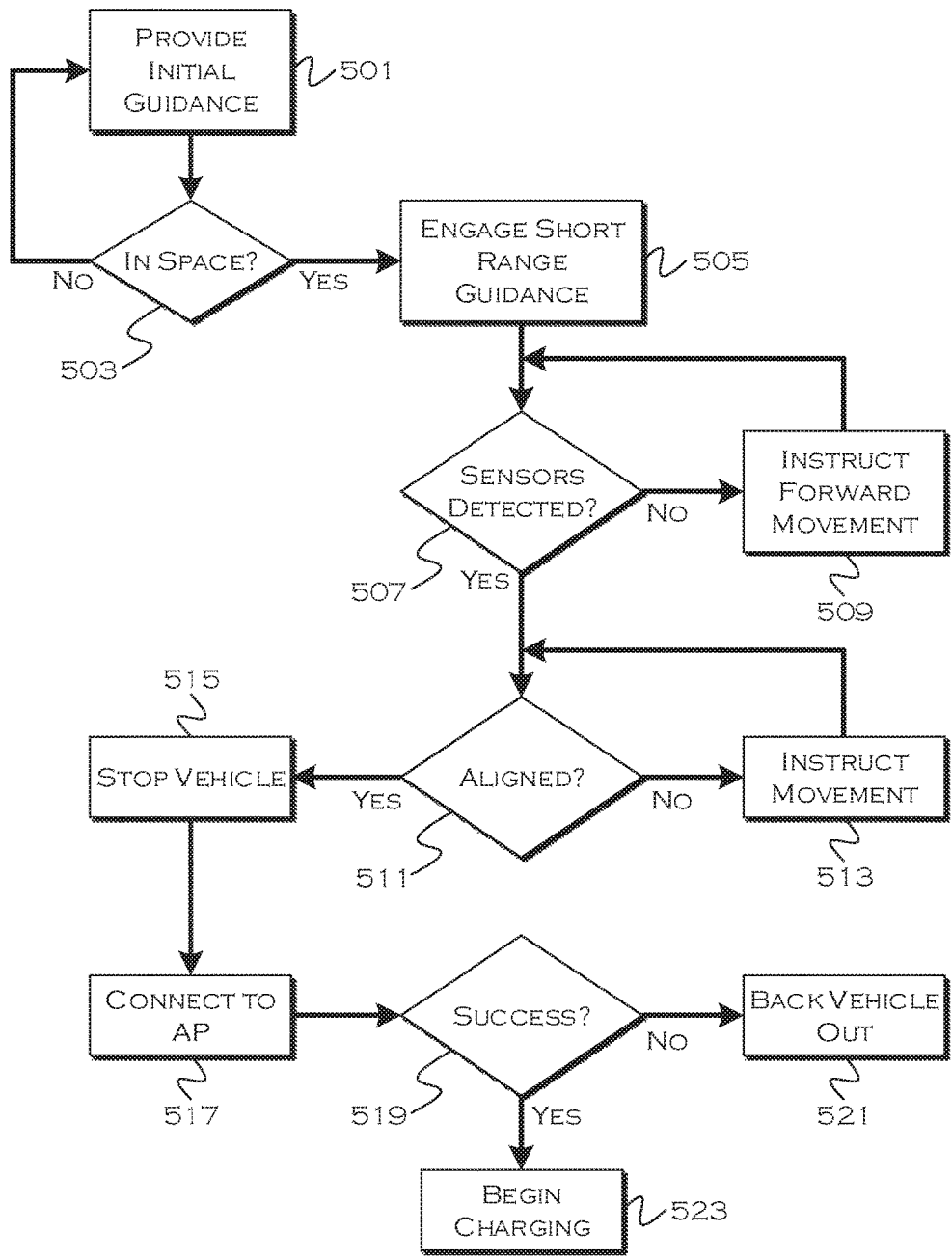
FIG. 5 shows an illustrative process for vehicle guidance.

FIG. 5 shows an illustrative process for vehicle guidance. In this illustrative example, the access point provides one or more signals to assist a vehicle in both choosing and reaching an appropriate pad, and in positioning in the proper location for charging.

The process may include an initial guidance 501 (e.g., please proceed to pad 5, or, please proceed to GPS coordinates X,Y, etc.) that assists a driver in locating the general area of the accepted charging pad. Until the vehicle reaches the designated pad area (which can be determined, for example, by local short-range sensors and/or direct communication with the vehicle), the initial guidance signal may persist. This signal may be sent as a broadcast, as well as a direct communication, for use in systems where direct communication is not established until the vehicle is partially or fully in position. The locations may be assigned or determined with the help of GPS or other wireless positioning technologies.

Once the vehicle reaches a pre-designated pad-area 503, in this example, the process engages one or more short-range precise guidance sensors 505. Precise guidance can take a variety of forms, any manner suitable for guiding the vehicle to the appropriate location is acceptable for utilization. In this example, short-range communication sensors (BT, BLE, Zigbee, Wi-Fi) may be used in conjunction with vehicle transmitters, transceivers or other components, to communicate vehicle element location(s) and guide the vehicle to the appropriate location.

In another example, multiple signal points (which can even be AP signal points for other APs) may be used to guide the vehicle to a location based on a known offset between a charge receptor and a wireless receiver in a vehicle.

Here, until the short range sensors in the charging area detect short range vehicle transmissions (or vice versa) 507, the process will instruct the vehicle to move forward 509 (or other appropriate direction). Once the sensors and signals engage 507, the process may determine if the vehicle is properly aligned (which could be based on received signal strength, or, in another example, based on all sensors receiving some form of signal if short enough range signals were utilized). Until alignment of the vehicle (in whatever form chosen) is detected 511, the process may instruct movement of the vehicle in the appropriate direction 513.

As previously noted, autonomous or partially autonomous driving may be used at some point to more quickly, precisely position a vehicle. In other examples, the driving directions may be issued via direct communication or even broadcast for use by a driver until the vehicle is in a proper location for charging.

Once the vehicle is aligned, the process may instruct, broadcast or otherwise communicate a stop signal 515. If a direct connection to the access point has not yet been established, the process can now established a formal direct connection 517. As before, if the connection is successfully established 519, the process may begin charging 523 (since the vehicle is already in position). If the connection fails, the process may broadcast a request that the vehicle leave the pad 521.

While connection is not established until the vehicle is in position for charging, in this example, the connection may be established much sooner in other examples. If the connection is not established (at any point), directions for positioning a vehicle may be broadcast by the access point or otherwise exchanged through, for example, short-range communication with a vehicle in a charging area.

Through use of the illustrative embodiments, a system and method for determining and managing charging pad availability, compatibility and usage may be achieved. The illustrative embodiments and similar variations provide for a time-saving, efficient connection vetting that will help ensure maximum up-time for charging points, and will help drivers avoid pointless and time-wasting connections to access points not affiliated with a charging pad or affiliated with unusable charging pads.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising:
   a processor configured to:
   determine that a first charging pad associated with a wireless access point is available for use;
   instruct the access point to communicate connection credentials and charging pad compatibility characteristics;
   receive a request from a vehicle computer, connected to the access point, to utilize the first charging pad;
   determine vehicle compatibility with the first charging pad;
   responsive to a requesting vehicle being compatible with the first charging pad, designate the first charging pad for use by the requesting vehicle;
   determine if a second of a plurality of charging pads associated with the wireless access point is available for use or reservation, following designation of the first charging pad for use; and
   responsive to a determination that a second charging pad is not available for use or reservation, instruct the access point to cease communication of credentials.

2. The system of claim 1, wherein the processor is configured to:
   set a countdown timer responsive to designating the first charging pad for use; and
   instruct the access point to communicate time remaining on the countdown timer.

3. The system of claim 2, wherein the processor is configured to release the designation of the first charging pad for use by the vehicle, responsive to expiration of the countdown timer.

4. The system of claim 2, wherein the processor is configured to terminate the countdown timer responsive to received indication that the vehicle has engaged with the charging pad.

5. The system of claim 1, wherein the processor is configured to:
   determine that a reserved time for use of the charging pad by a reserving vehicle is within a predefined threshold of a present time; and
   notify the requesting vehicle that charging will cease.

6. The system of claim 5, wherein the processor is configured to:
   cease charging responsive to the notifying; and
   send a request to the requesting vehicle to leave the charging pad.

7. The system of claim 1, wherein the processor is configured to:
   determine that a reserved time for use of the charging pad by a reserving vehicle is within a predefined threshold of a present time;
   instruct the access point to search for the reserving vehicle; and
   instruct the access point to communicate connection credentials and charging pad compatibility characteristics to the reserving vehicle, responsive to the access point establishing communication with the reserving vehicle.

8. A computer-implemented method comprising:
   responsive to a vehicle request to use a charging pad, communicating charging compatibility credentials via an access point receiving the request;
   responsive to a vehicle indicating charging pad compatibility based on the compatibility credentials, designating, via the access point, the charging pad for use by the vehicle; and
   responsive to the designating, rejecting credential communication requests while all charging pads affiliated with the access point are all designated for use.

* * * * *